July 1, 1952 — J. F. MORSE — 2,601,791
PUSH-PULL CONTROL CABLE
Filed July 22, 1949
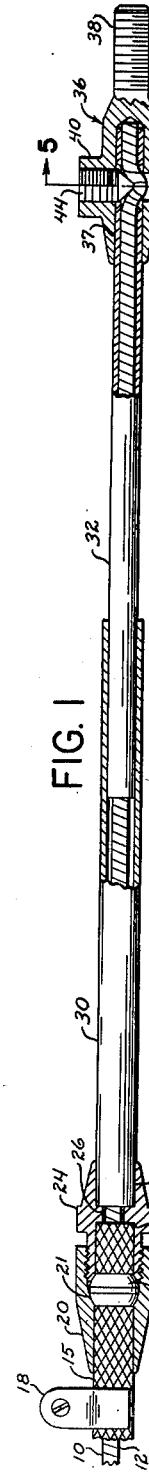
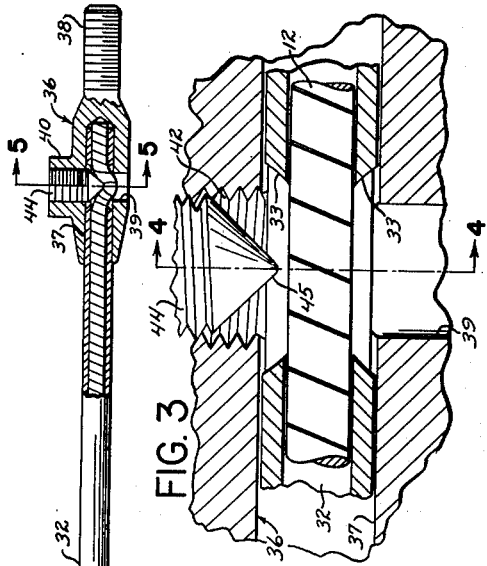
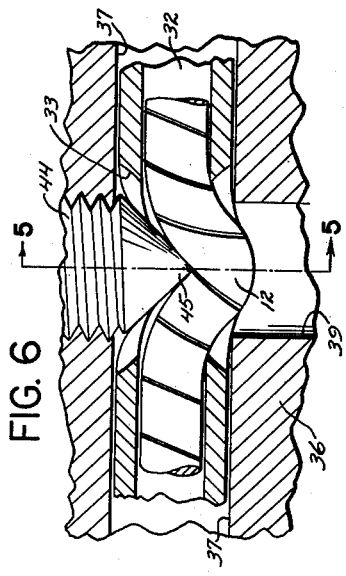
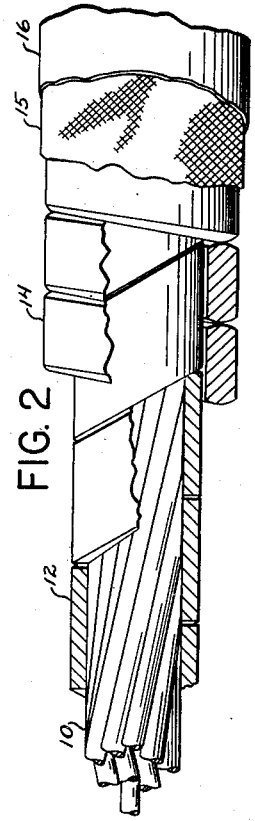
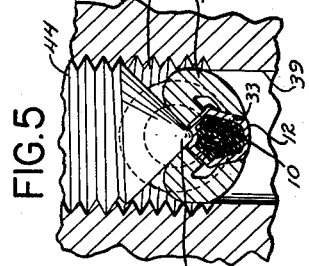
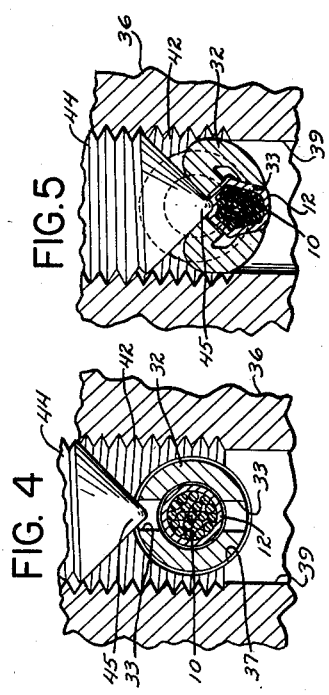
*INVENTOR.*
JOHN F. MORSE
BY Ely & Frye
ATTORNEYS

Patented July 1, 1952

2,601,791

UNITED STATES PATENT OFFICE 2,601,791

PUSH-PULL CONTROL CABLE

John F. Morse, Hudson, Ohio

Application July 22, 1949, Serial No. 106,140

5 Claims. (Cl. 74—501)

The present invention relates to the construction of flexible control cables of the so-called "push-pull" type which are designed for the transmission of mechanical motion in two directions. This type of cable assembly usually consists of a flexible casing or conduit, within which slides a core member, designed to carry both tension and compression loads which are imparted to it by the operator. The general field of use of control cables is in the transmission of light or medium loads where the motion must be transmitted to a point at some distance from the operator and where the motion must be carried around bends, and over or through obstructions such as bulkheads or the like. This type of control mechanism offers many advantages over other mechanical connections, both with respect to ease of installation and responsiveness to the load applied thereto.

A simple form of cable of this type consists of a single wire core sliding in a tube or coiled wire casing. While this type of cable is fairly satisfactory for the transmission of light loads, a single wire will build up excessive friction around short bends and is easily kinked, both of which factors greatly reduce its effectiveness.

To overcome these disadvantages and to transmit greater loads, there have been developed various types of so-called "high efficiency" cables which are sometimes composed of a bundle of several wires sliding as a unit within the outer casing or conduit. Or in place of the bundle of wires a small wire rope may be used, surrounded by a single wire wrapped as a coil with zero clearance between turns. In this type of core, the wire cable or rope takes the tension loads, while the exterior wire wrapping takes the compression loads. In some cases in this type of core, the exterior wrapping is formed by a flat wire or ribbon, spirally wound about the bundle of wires or wire cable so that it binds the wire cable into a firm but flexible column. In this latter type of core the spiral wrapping forms a smooth, outer surface which slides readily along the interior of the casing, while the inner cable takes both the tension and compression loads.

This invention has to do with improvements in the so-called "high-efficiency" type of control cable and the object of the invention is to improve upon the methods of attaching the flexible core member to the ends of the rigid control rods that serve to carry the motion into and out of the cable assembly.

A cable of the type referred to is, in former practices, attached at either end to a rigid rod, which is in turn attached to the control lever or manipulating device, or to the moving part of the mechanism to be actuated thereby. This is usually done by inserting the end of the core into a hole in the rod, usually an inch or so deep, and swaging the end of the rod into a tight permanent interlock with the core. This forms a permanent, high strength connection between the rigid rod and the flexible core, but such an operation cannot be performed at the location and must be done in the factory.

This is not a serious fault where the cable is installed at the factory, or where large quantities of identical size are being used, but where cables of miscellaneous lengths are to be installed in the field, for example in a power boat, accurate determination of the requisite cable length is required because the cable must, of necessity, be assembled at the factory and shipped to the user for installation. Aside from the cost and delays incident to furnishing cables cut to accurate length, errors may have been made in measurements which render the cable unfit for use and the cable must be sent back to the factory. Also where a manufacturer uses a variety of cable length, he must maintain a large inventory of cable assemblies to meet requirements without undue delay.

It is the purpose of the invention, therefore, to provide for a type of connection between the flexible core member and the rigid "push-pull" rod extension, which will permit stocking the core and casing material in bulk lengths and will make possible the cutting, fitting and assembly of the cable control unit on the job. To achieve this result, the rods are attached to the cable by a simple method and yet a permanent, non-slipping connection is obtained which is just as secure as that obtainable by the old methods.

There has been developed a type of core in which the wrapping about the inner wires is formed by several spirally wrapped wires, one of which is of greater diameter than the others so that it constitutes a screw thread by which the rigid extensions may be screwed on to the ends of the core. This type of core, however, is practical only for use within a rigid tubular outer casing as its rough surface does not slide satisfactorily in a spiral wire flexible casing, particularly where the core is caused to pass around abrupt curves. The invention herein described is not concerned with this latter type of core but is primarily designed for use with a core having a relatively smooth outer surface and intended for use within a spiral wire type of flexible casing or conduit.

The invention which is illustrated and described in its best known and preferred form provides a fully flexible cable assembly of the "high efficiency" type that can be cut to exact length, assembled and installed on the location with the use of simple hand tools. It has none of the disadvantages which are inherent in all of the previously known forms of flexible cables.

While the drawings and description show a complete and operative embodiment of the invention, it is not intended that the invention shall be limited to the form and embodiment shown but may be modified and improved upon within the scope of the invention as set forth in the claims appended hereto. The particular demand for improvement in cable construction, which has been the occasion for the present invention, was created by the call for some easy and time-saving method of installing high efficiency push-pull cables in power craft, but the invention is by no means limited to this field and may be used wherever there is a demand for some simple and effective means for installing "push-pull" cables on location.

In the drawings, in which the invention is shown in its best known and preferred form:

Fig. 1 is a view of one end of a flexible "push-pull" cable of the high efficiency type made in accordance with the invention.

Fig. 2 is an enlarged view of the main body of the control cable, this view showing the several elements stepped back.

Fig. 3 is an enlarged view taken at the point where the nipple or fitting is attached to one end of the core but before the permanent attachment is completed.

Fig. 4 is a section on the line 4—4 of Fig. 3.

Fig. 5 is a similar section but showing the completed connection, this view being a section on the line 5—5 of Fig. 6; and Fig. 6 is a view similar to Fig. 3 but showing the completed connection.

Referring to the drawings, the main body of the flexible "push-pull" core is comprised of an innermost cable bearing the reference numeral 10. This cable is preferably formed of a bundle or group of wires, but in the most efficient form illustrated herein it is composed of nineteen fine spring steel wire strands twisted together in the usual cable construction.

Around this cable is the cover or wrapping 12. This is composed of a flattened wire or ribbon, usually of a softer steel, wrapped tightly with slightly spaced apart turns, over the inner cable so as to grip and bind the wire cable into a firm column and to form a smooth, outer sliding surface to minimize friction and to permit easy to and fro movement within the flexible outer casing.

The core formed by the parts 10 and 12 has a sliding fit within the outer, flexible casing or conduit. This flexible outer casing is comprised of an inner, flexible tube 14, usually made of a spring brass flat wire with rounded edges and wrapped in spiral form in the opposite direction from the cover 12. Usually clearance of approximately .010" is provided between the outside of the core and the inside of the casing. About the tube 14 is applied a braided, textile cover 15, usually cotton, and over the cover is a waterproof coating 16 of lacquer or other waterproof material. The above described cable is extremely efficient and its use is preferred although the invention is not necessarily confined thereto. It is capable of being easily installed and will transmit motion in both directions through the movement of the inner core 10—12 in the casing. This movement is not impeded by bending it around obstacles.

The mechanic having laid out the length of the cable control, sufficient, for example, to reach from the control station which may be in the pilothouse to the clutch or throttle of the marine engine, cuts a length of the outer casing and a length of the inner core to the required dimensions and assembles and installs them in place by means of clips 18. He then slides a close-fitting sleeve or thimble 20 over the end of the cable. Midway of the sleeve is a conical seat 21, the outer end of the sleeve being interiorly threaded. Into the seat he now places a ring or sleeve 22, preferably made of soft brass and having a rounded or double coned outer surface, one side of which fits the seat 21.

Into the sleeve 20 is then threaded a nut, the inner end of which is tapered to bear against the ring 22 and force it into tight fitting relation to the sleeve 20 and the outer surface of the flexible casing. The nut is provided with an inner seat 25 to receive the end of the flexible casing and with a central passage 26 through which the core 10—12 is movable. Both the sleeve 20 and the nut 24 are provided with flattened surfaces so that the joint may be effected.

The outer end of the nut 24 is formed with an enlarged socket 28 in which may be pressed one end of a tube 30. This tube is preferably made of a hard brass so that it may be force fitted into the socket 28. It is of sufficient length to act as a guide tube anad to telescopically receive the rigid extension sleeve by which the cable is actuated and to allow for the maximum movement of the core.

In reasonably close, sliding fit with the interior of the tube 30 is the elongated sleeve 32, preferably made of seamless steel tubing. The inner core 10—12 extends through the full length to the outer end of this sleeve. Near the outer end the tubular sleeve is apertured at diametrically opposite points, as indicated at 33. These apertures may be made as slots by a circular sow.

Over the end of the sleeve is fitted a clamp or terminal connection indicated as a whole by the numeral 36. The clamp is provided with an axial bore 37 extending from its inner end to receive the sleeve 32. The outer end of the clamp may be threaded as at 38 for connection with the control lever or other part to which the cable is to be attached. At a point to register with the slots 33, the clamp is drilled to provide a through transverse hole 39 which intersects the bore 37. At this point the clamp is preferably provided with a projecting boss 40 and the passage 39 is threaded at this point as shown at 42.

Into this threaded portion of the passage 39 is screwed a hardened steel pin or set screw 44, the inner end of which is formed with a tapered or cone point 45 which, as the set screw is driven inwardly, enters the adjacent slot 33.

After the mechanic has cut the cable parts to their proper length and attached the casing parts 20, 22, 24 and 30 to both ends, he applies the fittings to the ends of the core. He inserts the tubular sleeve 32 over the core, into the guide tube 30, being certain that there is sufficient play so that the maximum throw of the control lever will be accommodated and if any excess of the core is exposed beyond the sleeve this is trimmed away. He now places the outer fitting 36 over the outer end of the sleeve, being sure that the transverse passage 39 is in alignment with the slots 33 in the sleeve. He then turns down the set screw 44 with sufficient force to distort the adjacent end of the sleeve and the inner cable so as to form the tight connection between the fitting 36 and the sleeve and the core 10—12. The material of which the sleeve and core 10—12 are formed cause these parts to change their form from that shown in Figs. 3 and 4 to that shown in Figs. 5 and 6. The sleeve 32 will be deformed into approximately the shape shown in Fig. 5 and forced into the lower part of passage 39. The inner core 10—12 will be forced into the lower slot 33 by the combined pressure of the screw point and turned down edges of the upper slot 33.

This forms a solid connection between the elements at the end of the cable so that as the fitting 36 is moved in response to the thrust applied to it in either direction, the inner core 10—12 will be moved in its outer casing, the sleeve 32 sliding in the outer tubular guide 30.

It will be seen that an easy method is provided by which a flexible "push-pull" cable may be built on the job to the exact requirements by the use of simple hand tools and that it is necessary to maintain only a limited stock of standard casing, core and end fittings, to adequately cover the requirements of a variety of distances between the control stations and the mechanism to be operated. The connection afforded by the assembly shown in the drawings is positive because the screw 44 firmly locks the fitting 36 with the sleeve 32 and with the core 10—12.

The construction of the cable as shown in the drawings and as described herein is not necessarily employed, but is shown as the preferred type of cable.

What is claimed is:

1. A flexible cable of the "push-pull" type having an outer casing and an inner flexible core, the core projecting outwardly of the casing, a tubular guide extending from the casing and surrounding the projecting end of the core, a deformable sleeve over the core and telescoping with the guide, a fitting on the outer end of the sleeve, an aperture formed in the outer end of the sleeve, a recess in the fitting in alinement with the aperture, and a set screw threaded into the fitting and adapted to enter the aperture and distort the sleeve and the core into interlocking engagement with the recess in the fitting.

2. A "push-pull" device having a flexible cable, a deformable sleeve for one end of the cable, the outer end of the sleeve having an aperture, a fitting for the sleeve, said fitting having a recess in alinement with the aperture, a pin having a pointed end threaded into the fitting, the pointed end of the pin adapted to enter the aperture, bear against the cable and to distort the sleeve and the cable into interlocking engagement with the recess in the fitting and with each other.

3. A "push-pull" control device comprising a flexible cable assembly composed of an outer casing and a wire cable movable longitudinally within the casing, a fitting for one end of the casing, a guide attachable to the fitting and adapted to extend along an exposed portion of the cable extending beyond the casing, a deformable sleeve to surround the exposed cable and movable along the guide, a second fitting for the end of the sleeve, a recess opening from the interior of the sleeve and a set screw in the second fitting adapted to enter an aperture in the sleeve and distort the sleeve and the cable into interlocking relation with each other and with the recess in the second fitting.

4. A push-pull control cable comprising a flexible power transmitting core composed of a plurality of wires and a spiral metal ribbon forming an outer cover for said core, a deformable sleeve surrounding an end of said core and adapted to form a guiding means for the core during its longitudinal movement, a fitting over the sleeve, said fitting having a longitudinal bore to receive the ends of the core and the sleeve and an aperture extending across the bore, said aperture being threaded, aligned apertures in the sleeve registering with the aperture in the fitting, and a set screw threaded in the aperture in the fitting and having a pointed end adapted to bear against the core to deform the core and the sleeve so that they project into the aperture in the fitting and interlock the fitting, the sleeve and the core.

5. A push-pull control cable comprising a flexible power transmitting core, a deformable sleeve surrounding an end of said core and adapted to act as a guiding means for said core during its longitudinal movement, a fitting over the sleeve, said fitting having a longitudinal bore to receive the ends of the core and the sleeve and an aperture extending across the bore, said aperture being threaded, aligned apertures in the sleeve registering with the aperture in the fitting, and a set screw threaded in the aperture in the fitting, the inner end of the set screw adapted to bear against the core and deform the core and the sleeve so that they project into the aperture in the fitting and interlock the fitting, the sleeve and the core.

JOHN F. MORSE.

REFERENCES CITED

The following references are of record in the file of this patent:

UNITED STATES PATENTS

| Number | Name | Date |
|---|---|---|
| 270,478 | Pumphrey | Jan. 9, 1883 |
| 940,742 | Simpson | Nov. 23, 1909 |
| 1,630,213 | Petry | May 24, 1927 |
| 1,642,345 | Telford | Sept. 13, 1927 |
| 2,063,399 | Rasmussen | Dec. 8, 1936 |

FOREIGN PATENTS

| Number | Country | Date |
|---|---|---|
| 1,985 | Australia | May 24, 1927 |